(12) United States Patent
Sawada

(10) Patent No.: US 7,192,372 B2
(45) Date of Patent: *Mar. 20, 2007

(54) HYDRAULIC PRESSURE SENSOR FAILURE CONTROL SYSTEM FOR BELT-TYPE CONTINUOUSLY VARIABLE TRANSMISSION

(75) Inventor: Makoto Sawada, Fuji (JP)

(73) Assignee: Jatco Ltd (JP)

( * ) Notice: Subject to any disclaimer, the term of this patent is extended or adjusted under 35 U.S.C. 154(b) by 357 days.

This patent is subject to a terminal disclaimer.

(21) Appl. No.: 10/647,900

(22) Filed: Aug. 25, 2003

(65) Prior Publication Data

US 2004/0092343 A1    May 13, 2004

(30) Foreign Application Priority Data

Sep. 3, 2002    (JP)    ............................. 2002-257547

(51) Int. Cl.
*F16H 61/00*    (2006.01)

(52) U.S. Cl. ...................................................... 474/28

(58) Field of Classification Search ............... 474/8, 474/12, 18, 28, 44; 477/43, 44, 45, 46, 47, 477/48

See application file for complete search history.

(56) References Cited

U.S. PATENT DOCUMENTS

| | | | |
|---|---|---|---|
| 5,092,198 A * | 3/1992 | Morishige et al. ............ | 477/46 |
| 5,188,007 A | 2/1993 | Hattori et al. | |
| 6,591,177 B1 | 7/2003 | Loffler | |
| 6,623,386 B1 * | 9/2003 | Mizui .......................... | 474/28 |
| 2001/0049315 A1 | 12/2001 | Tsutsui | |
| 2002/0037788 A1 * | 3/2002 | Hagiwara et al. ............. | 477/46 |
| 2004/0110584 A1 * | 6/2004 | Sawada et al. ............... | 474/18 |

FOREIGN PATENT DOCUMENTS

DE    199 52 476 A1    5/2001

OTHER PUBLICATIONS

Relevant portion of European Search Report for corresponding application EP 03 25 5082.

* cited by examiner

*Primary Examiner*—Vicky A. Johnson
(74) *Attorney, Agent, or Firm*—Rossi, Kimms & McDowell LLP

(57) ABSTRACT

In case a primary hydraulic pressure sensor is normal, when reverse rotation of pulleys is detected a primary pulley (Plpri) torque capacity is calculated from a primary pressure detected by the primary hydraulic pressure sensor. When the primary hydraulic pressure sensor fails, a secondary hydraulic pressure sensor is checked, and when the secondary hydraulic pressure sensor is normal, the PLpri torque capacity is determined from a secondary pressure detected by the secondary hydraulic pressure sensor by using a map. On the other hand, when the secondary hydraulic pressure sensor fails too, the PLpri torque capacity is read out from the map by using a secondary pressure target value as the secondary pressure.

6 Claims, 4 Drawing Sheets

HYDRAULIC PRESSURE SENSOR FAILURE CONTROL SYSTEM FOR BELT-TYPE CONTINUOUSLY VARIABLE TRANSMISSION

BACKGROUND OF THE INVENTION

1. Field of the Invention

The present invention relates to a hydraulic pressure sensor failure control system for a belt-type continuously variable transmission.

2. Description of the Prior Art

As a known example of a continuously variable transmission for a vehicle, Japanese laid-open patent publication No. 8-210449 discloses a belt-type continuously variable transmission (hereinafter referred to as a "belt CVT") with a V-belt.

In this belt CVT, a transmission mechanism is constructed by winding the V-belt around pulleys comprised of a primary pulley connected to an engine side and a secondary pulley connected to an axle side, and groove widths of the primary pulley and the secondary pulley are variably controlled by hydraulic pressure.

A thrust of the pulley is determined according to an input torque and a gear ratio and converted into a hydraulic pressure on the basis of predetermined values such as pressure-receiving areas of the secondary pulley and the primary pulley, and this hydraulic pressure is supplied to the transmission mechanism as a target line pressure.

The primary pulley and the secondary pulley are respectively provided with a first cylinder chamber and a second cylinder chamber, the first cylinder chamber is supplied with a primary pressure obtained by regulating line pressure, and the second cylinder chamber is supplied with line pressure or a secondary pressure obtained by regulating the line pressure. The groove widths of the primary pulley and the secondary pulley are changed by hydraulic pressure supplied to the respective cylinder chambers during running of the vehicle, and gear ratio is continuously changed according to a contact radius ratio (pulley ratio) between the V-belt and the respective pulleys.

In such a belt CVT, when the vehicle is once stopped by removal of a driver's foot from the accelerator pedal and braking during running on a upward slope in a forward "D" range and started again in the "D" range, the vehicle is slightly moved backward by the removal of the driver's foot from a brake pedal, and then a reverse torque is applied to an output shaft of the belt CVT, and a reverse rotation is generated in the pulleys.

Even if the pulley ratio, the input torque, an input rotation speed or the secondary pressure is the same when the pulleys are reversely rotated, balance in hydraulic pressure between the primary pressure and the secondary pressure is lost, the primary pressure is especially reduced by half, and torque capacity of the primary pulley is reduced, so that belt slip may be generated. However, since no control to prevent this disruption of the balance of hydraulic pressure has been conventionally performed, no case where a primary hydraulic pressure sensor fails has been considered.

The above-mentioned reverse rotation of the pulleys is generated also when the vehicle is started again in an "R" range after it is stopped once while running backward in the "R" range on a down slope, whereby the torque capacity of the primary pulley is also reduced.

That is, the reverse rotation of the pulleys discussed herein means a phenomenon that the pulleys are rotated reversely with respect to a direction of a normal rotation of the pulleys (forward direction in the "D" range or backward direction in the "R" range) to be supposed in a currently selected range position. The reverse rotation of the pulleys is used in this meaning hereinafter.

SUMMARY OF THE INVENTION

In view of the aforementioned conventional problem, therefore, it is an object of the present invention to provide a hydraulic pressure sensor failure control system for a belt-type continuously variable transmission in which a torque capacity of a primary pulley can be calculated with a high precision even in case the hydraulic pressure sensor fails when a reverse rotation of a pulleys is generated.

Therefore, the present invention provides a hydraulic pressure sensor failure control system for a belt-type continuously variable transmission provided with a transmission mechanism constructed by winding a belt between a primary pulley and a secondary pulley, a primary hydraulic pressure sensor for detecting a primary pressure, a secondary hydraulic pressure sensor for detecting a secondary pressure, pulley reverse rotation detecting means for detecting a reverse rotation of pulleys, primary pulley torque capacity calculating means for calculating a torque capacity of the primary pulley from the primary pressure and pulley reverse rotation time control means for performing a predetermined control on the basis of the torque capacity of the primary pulley during the reverse rotation of the pulley, wherein the primary pulley torque capacity calculating means calculates the torque capacity of the primary pulley on the basis of the secondary pressure detected by the secondary hydraulic pressure sensor when the primary hydraulic pressure sensor fails.

According to the present invention, as described above, in the Belt CVT having the primary pulley torque capacity calculating means for calculating torque capacity of the primary pulley from primary pressure and performing, at the time of reverse rotation of the pulleys, a predetermined control such as increase and correction of line pressure on the basis of the torque capacity of the primary pulley, torque capacity of the primary pulley is calculated on the basis of secondary pressure detected by the secondary hydraulic pressure sensor when the primary hydraulic pressure sensor fails, whereby a proper control can be achieved without loss of control.

The above and further objects and features of the invention will be more fully apparent from the following description when the same is considered with reference to the accompanying drawings.

DETAILED DESCRIPTION OF THE PREFERRED EMBODIMENT

A preferred embodiment of the present invention will be described hereinbelow.

Figure 1:
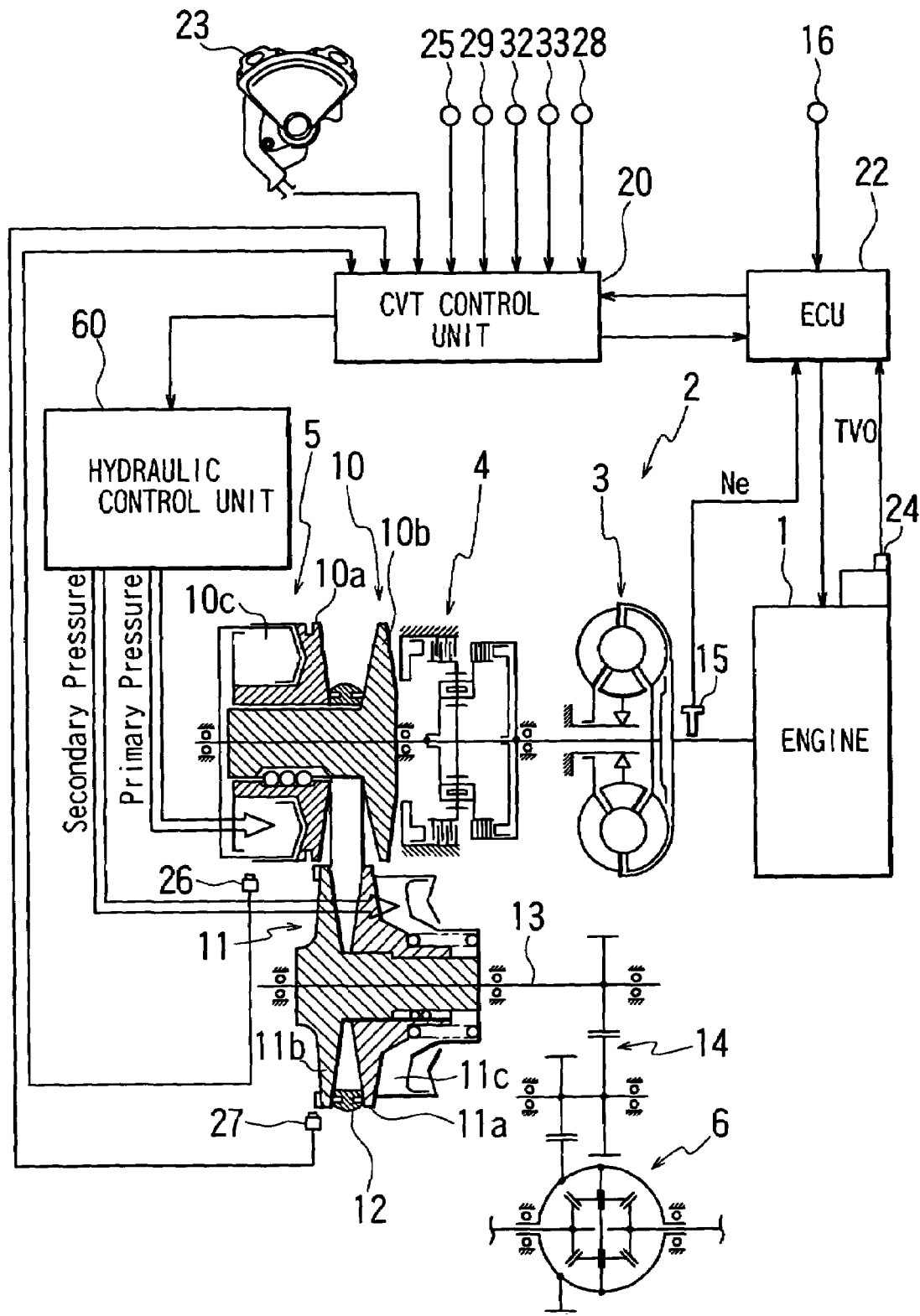
FIG. 1 is a schematic block diagram showing a V-belt type continuously variable transmission to which the present invention is applied.
Figure 2:
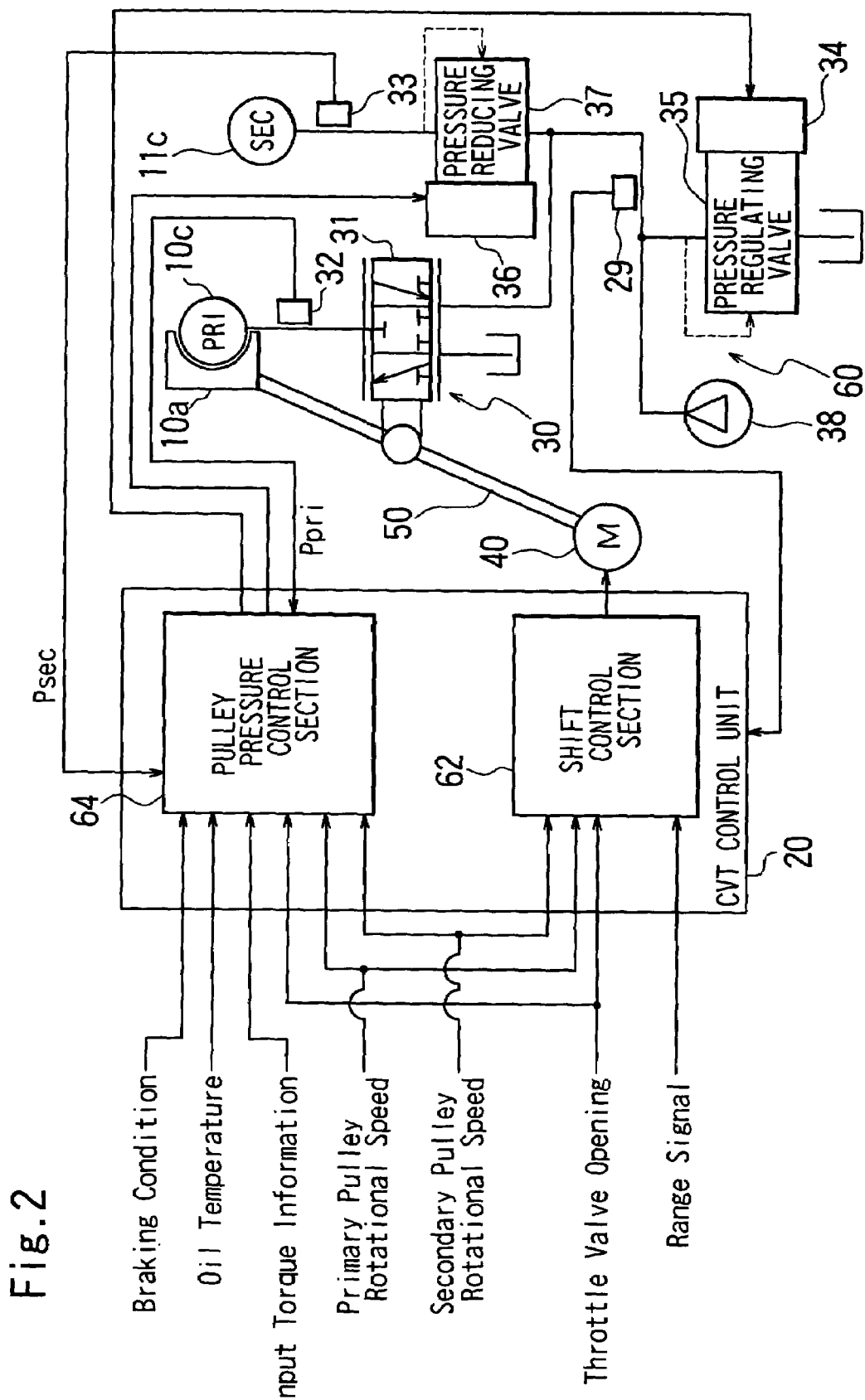
FIG. 2 is a schematic block diagram showing a hydraulic pressure control unit and a CVT control unit.

FIG. 1 is a schematic block diagram showing a belt CVT to which the present invention is applied, and FIG. 2 is a schematic block diagram showing a hydraulic pressure control unit and a CVT control unit.

A belt CVT 2 comprised of a torque converter 3 provided with a lockup clutch and a transmission mechanism 5 provided with a forward/reverse switching mechanism 4 is connected to an engine 1. The transmission mechanism 5 is, as a pair of pulleys, provided with a primary pulley 10 arranged on an input shaft side and a secondary pulley 11 connected to an output shaft 13, and this pair of pulleys are connected to each other by a V-belt 12. The output shaft 13 is connected to a differential 6 through an idler gear 14.

Gear ratio of the transmission mechanism 5 and contact frictional force of the V-belt 12 are controlled by a hydraulic pressure control unit 60 activated according to a command from a CVT control unit 20. The CVT control unit 20 is connected to an engine control unit (ECU) 22 controlling the engine 1, and the former and the latter exchange information with each other.

The CVT control unit 20 determines the gear ratio and the contact frictional force on the basis of an input torque information from the engine control unit 22, a throttle valve opening (TVO) from a throttle opening sensor 24 or the like. The input torque information includes an engine demand torque and an engine actual torque estimated as to be actually generated by the engine.

The engine control unit 22 receives rotational speed Ne of the engine 1 from an engine speed sensor 15 and the throttle valve opening TVO from the throttle opening sensor 24 and it controls fuel injection amount and ignition timing on the basis of a current throttle valve opening TVO and the engine speed Ne.

The primary pulley 10 of the transmission mechanism 5 is comprised of a fixed conical plate 10b rotating together with the input shaft and a movable conical plate 10a which is opposed to the fixed conical plate 10b to form a V-shaped pulley groove and can be moved in the axial direction according to a hydraulic pressure (hereinafter referred to as primary pressure) acting on a primary pulley cylinder chamber 10c.

The secondary pulley 11 is comprised of a fixed conical plate 11b rotating together with an output shaft 13 and a movable conical plate 11a which is opposed to the fixed conical plate 11b to form a V-shaped pulley groove and can be moved in the axial direction according to a hydraulic pressure (hereinafter referred to as secondary pressure) acting on a secondary pulley cylinder chamber 11c.

The input torque inputted from the engine 1 is inputted through the torque converter 3 to the transmission mechanism 5 and transmitted from the primary pulley 10 to the secondary pulley 11 via the V-belt 12. The movable conical plate 10a of the primary pulley 10 and the movable conical plate 11a of the secondary pulley 11 are displaced in the axial direction to change a contact radius of the V-belt 12 and the respective pulleys 10, 11, whereby gear ratio between the primary pulley 10 and the secondary pulley 11 can be continuously changed.

The CVT control unit 20 receives signals from a first primary pulley speed sensor 26 for detecting rotational speed Npri of the primary pulley 10 of the transmission mechanism 5, a second primary pulley speed sensor 28 arranged out of phase with respect to the first primary pulley speed sensor 26, a secondary pulley speed sensor 27 for detecting rotational speed Nsec of the secondary pulley 11, a primary hydraulic pressure sensor 32 for detecting a primary pressure (Ppri) acting on the primary pulley cylinder chamber 10c of the primary pulley and a secondary hydraulic pressure sensor 33 for detecting a secondary pressure (Psec) acting on the secondary pulley cylinder chamber 11c of the secondary pulley and a range signal from an inhibitor switch 23.

Since the output shaft 13 of secondary pulley 11 is connected to the axle, a vehicle speed Ns can be determined from the rotational speed Nsec of the secondary pulley.

The CVT control unit 20 also receives an oil temperature of the transmission mechanism 5 detected by an oil temperature sensor 25 and a signal of the throttle valve opening (TVO) through the engine control unit 22.

As shown in FIG. 2, the hydraulic pressure control unit 60 is mainly comprised of a pressure-regulating valve 35 for controlling line pressure, a shift control valve 30 for controlling the primary pressure applied to the primary pulley cylinder chamber 10c and a pressure-reducing valve 37 for controlling the secondary pressure applied to the secondary pulley cylinder chamber 11c.

The shift control valve 30 is connected to a servo link 50 constituting a mechanical feedback mechanism and activated by a step motor 40 connected to one end of the servo link 50 and at the same time receives feedback of the groove width, that is, the actual gear ratio from the movable conical plate 10a of the primary pulley 10 connected to the other end of the servo link 50.

A line pressure control system is constituted by the pressure-regulating valve 35 provided with a solenoid 34 for regulating pressure oil from a hydraulic pump 38 and regulates the pressure oil to a predetermined line pressure according to a driving condition in response to a command (for example a duty signal) from the CVT control unit 20. The line pressure is respectively supplied to the shift control valve 30 for controlling the primary pressure and to the pressure reducing valve 37 provided with a solenoid 36 for controlling the secondary pressure. Further, a line pressure sensor 29 for detecting hydraulic pressure of line pressure is connected to the CVT control unit 20.

Gear ratio between the primary pulley 10 and the secondary pulley 11 is controlled by the step motor 40 driven according to a shift command signal form the CVT control unit 20, a spool 31 of the shift control valve 30 is activated according to a displacement of the servo link 50 moving in response to the step motor 40, and primary pressure obtained by regulating line pressure supplied to the shift control valve 30 is supplied to the primary pulley, whereby groove width is variably controlled to set a predetermined gear ratio.

The shift control valve 30 supplies and discharges hydraulic pressure to and from the primary pulley cylinder chamber 10c according to the displacement of the spool 31, regulates the primary pressure to achieve a target gear ratio commanded in a drive position of the step motor 40 and closes the spool 31 according to the displacement from the servo link 50 when speed change is actually completed.

The CVT control unit 20 is comprised of a shift control section 62 that determines a target gear ratio according to the vehicle speed NS and the throttle valvr opening TVO and drives the step motor 40 to control the actual gear ratio to the target gear ratio and a pulley pressure control section 64 that calculates the thrust (contact frictional force) of the primary pulley 10 and the secondary pulley 11 according to the input torque information from the engine control unit 22, gear ratio and oil temperature, and converts the calculated thrust into an oil pressure.

The pulley pressure control section 64 determines a target value of line pressure according to the input torque information, the gear ratio based on the rotation speeds of the primary pulley and the secondary pulley and the oil temperature and controls the line pressure by activating the solenoid 34 of the pressure-regulating valve 35. The pulley pressure control section 64 also determines a target value of the secondary pressure and activates the solenoid 36 of the pressure-reducing valve 37, according to the value detected by the secondary hydraulic pressure sensor 33 as well as the target value, to control the secondary pressure by feedback control. Engine actual torque or engine demand toque used as input torque information is arbitrarily selected according to control purpose.

Further, the pulley pressure control section 64 calculates torque capacity (PLpri torque capacity) of the primary pulley and transmits a torque limit value for a torque-down control to the engine control unit 22. The pulley pressure control section 64 also detects presence and absence of reverse rotation of the pulleys accompanying the stop of the vehicle and sets line pressure by adding shortage of torque in case the PLpri torque capacity is smaller than the input torque when the reverse rotation of the pulleys is detected.

The PLpri torque capacity is calculated from the primary pressure Ppri detected by the primary hydraulic pressure sensor 32, but when the primary hydraulic pressure sensor 32 fails, the PLpri torque capacity is determined from a map, which is previously set as an estimation value, on the basis of secondary pressure Psec detected by the secondary hydraulic pressure sensor.

Moreover, when the secondary hydraulic pressure sensor fails too, a PLpri torque capacity estimation value is determined from the above-mentioned map by using a target value of the secondary pressure which is essentially calculated by the pulley pressure control section 64.

Figure 3:
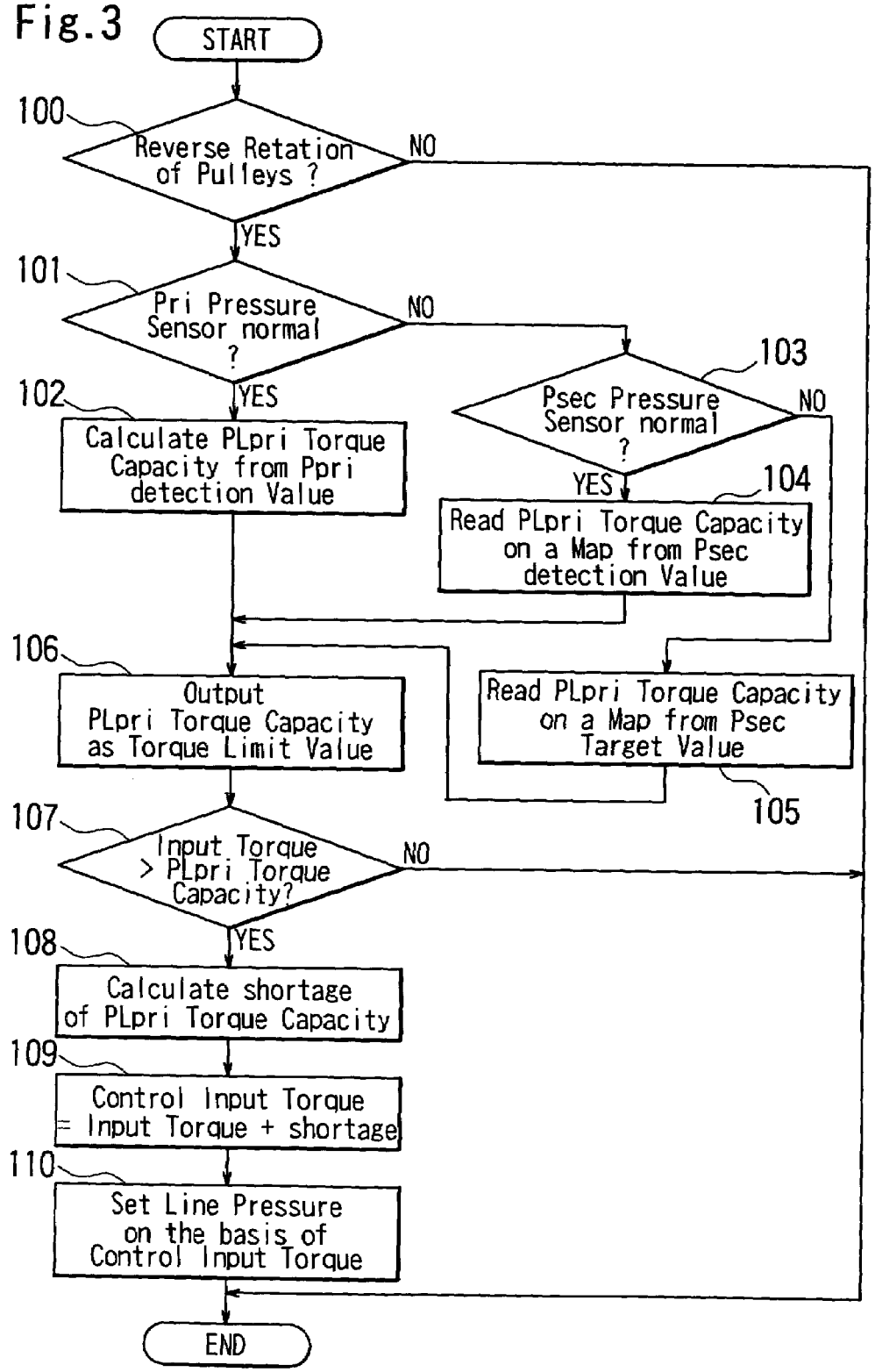
FIG. 3 is a flowchart showing a flow of control that is applied to reverse rotation of pulleys.

FIG. 3 is a flowchart showing a flow of control that is applied to reverse rotation of the pulleys in the pulley pressure control section 64.

First in a Step 100, it is checked whether reverse rotation of the pulleys is generated. For example, this reverse rotation of the pulleys can be checked by arranging the first primary pulley speed sensor 26 and the second primary pulley speed sensor 28 so that they are 90 degrees out of phase with respect to each other, determining a rotation direction from waveform phase differences picked up by the respective sensors and comparing this rotation direction with a range signal from the inhibitor switch 23. When the reverse rotation of the pulleys is generated, the routine proceeds to a Step 101, and when no reverse rotation is generated, this control flow is finished.

In the Step 101, it is checked whether the primary hydraulic pressure sensor 32 is normal. When the primary hydraulic pressure sensor 32 is normal, the routine proceeds to a Step 102, and the PLpri torque capacity is calculated using the primary pressure Ppri that is a detection value of the primary hydraulic pressure sensor 32.

When failure of the primary hydraulic pressure sensor 32 is checked in the Step 101, the routine proceeds to a Step 103, and it is checked whether the secondary hydraulic pressure (Psec) sensor 33 is normal. When the secondary hydraulic pressure sensor 33 is normal, the routine proceeds to a Step 104, and when it fails, the routine proceeds to a Step 105.

Figure 4:
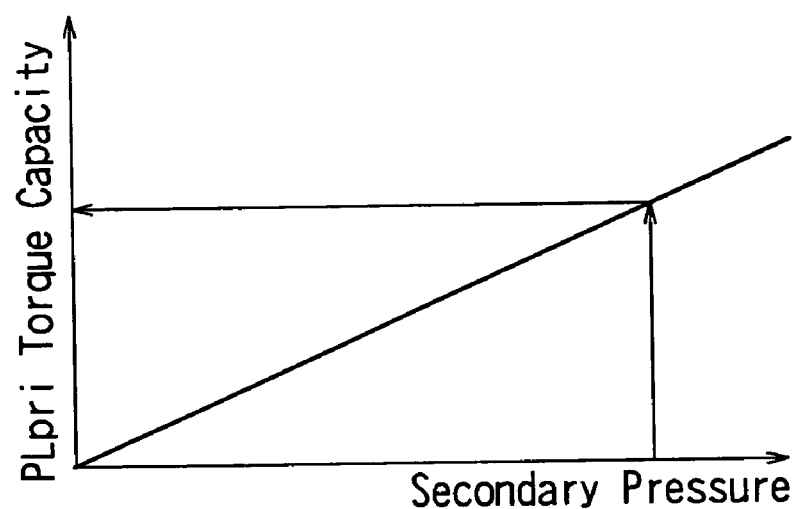
FIG. 4 is a diagram showing a secondary pressure-primary pulley torque capacity map.

In the Step 104, the PLpri torque capacity is determined as an estimation value from secondary pressure Psec, which is an detection value of the secondary hydraulic pressure sensor 33, by using a secondary pressure-PLpri torque capacity map as shown in FIG. 4.

This map is prepared by estimating primary pressure according to secondary pressure while considering that primary pressure is reduced to around 60% of secondary pressure when reverse rotation of the pulleys is generated, and calculating torque capacity of the primary pulley in advance on the basis of these respective primary pressure estimated, whereby the PLpri torque capacity can be read out directly from secondary pressure.

On the other hand, in the Step 105, output from the secondary hydraulic pressure sensor 33 is not used, and the PLpri torque capacity is read out from the above-mentioned secondary pressure-PLpri torque capacity map by using a secondary pressure target value as secondary pressure.

After the PLpri torque capacity is thus determined in the Steps 102, 104, 105, the PLpri torque capacity is transmitted to the engine control unit 22 as a torque limit value in a Step 106. Since the engine control unit 22 controls output (engine actual torque) of the engine by setting this torque limit value as an upper limit, torque down is performed when the engine actual torque is larger than this torque limit value. Here, although it is no problem to set the torque limit value smaller than the PLpri torque capacity calculated, but since power performance is degraded as the upper limit of the torque limit value is set to a small value, it is desirable that the upper limit is set to the PLpri torque capacity.

Next, in a step 107, a comparison of input torque and the PLpri torque capacity is performed. Here, as input torque, there is used an engine demand torque which is a toque required to the engine, and calculated from an accelerator stroke from an accelerator stroke sensor 16 and an engine speed. This engine demand torque has a value not reflecting a torque limit value transmitted from the CVT control unit 20. When the input torque is larger than the PLpri torque capacity, the routine proceeds to a Step 108, and when the input torque is equal to or smaller than the PLpri torque capacity, this control flow is finished.

In the Step 108, shortage (input torque—PLpri torque capacity) of the PLpri torque capacity for the input torque is calculated. Then, in a Step 109, a control input torque is determined by adding the shortage of the PLpri torque capacity as a correction amount to the input torque. The correction amount can be provided with a gain or an offset if necessary.

After this, in a Step 110, a line pressure is set on the basis of the above-mentioned control input torque.

In this embodiment, the Step 100 constitutes pulley reverse rotation detecting means according to the invention, the Steps 101 to 105 constitute primary pulley torque capacity calculating means, and the Steps 106 to 110 constitute pulley reverse rotation time control means.

This embodiment is thus constructed, and in the Belt CVT performing, at the time of generation of reverse rotation, a control such as increase and correction of line pressure on the basis of torque capacity of the primary pulley calculated from primary pressure detected by the primary hydraulic pressure sensor, PLpri torque capacity is calculated on the basis of secondary pressure detected by the secondary hydraulic pressure sensor when the primary hydraulic pressure sensor fails, whereby a proper control can be achieved without loss of control.

When the secondary hydraulic pressure sensor fails too, torque capacity of the primary pulley is calculated using a secondary pressure target value as secondary pressure, whereby control based on the torque capacity of the primary pulley can be continued regardless of failure of both the primary hydraulic pressure sensor and the secondary hydraulic pressure sensor.

Calculation of torque capacity of the primary pulley based on secondary pressure is executed by reading out primary pulley torque capacity (PLpri torque capacity) from secondary pressure (Psec) by means of a map in which primary pressure is estimated according to secondary pressure and torque capacity of the primary pulley is calculated in advance on the basis of each primary pressure estimated, whereby a complicated arithmetic operation processing or the like is not required, and processing is simplified.

Primary pressure using line pressure as original pressure and secondary pressure using line pressure as original pressure are applied to the primary pulley and the secondary pulley respectively, and a primary pulley torque capacity is calculated from the primary pressure. Simultaneously with this, reverse rotation of the pulleys is detected, and comparison between input torque and the primary pulley torque capacity estimated from the secondary pressure is performed during the reverse rotation of the pulleys. When the input torque is larger than the primary pulley torque capacity, the input torque is increased and corrected according to shortage of the primary pulley torque capacity, and line pressure is set on the basis of the input torque increased and corrected. Therefore, the primary pressure whose balance is lost during reverse rotation of the pulleys can be increased, and even if the primary hydraulic pressure sensor fails, slip between the primary pulley and the V-belt can be prevented.

Since the line pressure is increased when the reverse rotation of the pulleys is detected, the line pressure is not increased to a high hydraulic pressure unnecessarily and causes no degradation of the power performance.

Since increase and correction of the input torque are performed by adding the shortage of the primary pulley torque capacity, which is estimated from secondary pressure, to the input torque, the torque capacity of the primary pulley can be set to a proper one, even if the primary hydraulic pressure sensor fails.

Moreover, in the engine control unit 22, torque-down control excellent in responsibility compared to hydraulic pressure is simultaneously performed. Thereby, engine torque can be controlled to be smaller than torque capacity of the primary pulley estimated from secondary pressure as soon as reverse rotation of the pulleys is detected, and even if the primary hydraulic pressure sensor fails, generation of slip of the V-belt can be certainly prevented. Further, since output of the engine is controlled by setting the primary pulley torque capacity occasionally calculated to an upper limit, as described above, slip of the V-belt caused thereinafter can be prevented, torque limit value of the engine gradually exceeds the engine demand torque, and torque down of the engine is not actually performed, so that degradation of power performance can be also prevented.

An example of detection process of reverse rotation of the pulleys is explained in the Step 100 in the above embodiment, however the present invention is not limited to this, but other proper detection process may be adopted.

What is claimed is:

1. A hydraulic pressure sensor failure control system for a belt-type continuously variable transmission having a transmission mechanism constructed by winding a belt around pulleys comprised of a primary pulley connected to an engine side and a secondary pulley connected to an output shaft, applying a primary pressure and a secondary pressure which respectively use a line pressure as an original pressure to the primary pulley and the secondary pulley, comprising:
   a primary hydraulic pressure sensor for detecting the primary pressure;
   a secondary hydraulic pressure sensor for detecting the secondary pressure;
   pulley reverse rotation detecting means for detecting reverse rotation of the pulleys;
   primary pulley torque capacity calculating means for calculating a torque capacity of the primary pulley from the primary pressure; and
   pulley reverse rotation time control means for performing a predetermined control on the basis of the torque capacity of the primary pulley when the reverse rotation of the pulleys is detected;
   wherein said primary pulley torque capacity calculating means calculates the torque capacity of the primary pulley on the basis of the secondary pressure detected by the secondary hydraulic pressure sensor when the primary hydraulic pressure sensor fails.

2. A hydraulic pressure sensor failure control system for a belt-type continuously variable transmission according to claim 1, wherein said primary pulley torque capacity calculating means calculates the torque capacity of the primary pulley using a secondary pressure target value as the secondary pressure when the secondary hydraulic pressure sensor fails too.

3. A hydraulic pressure sensor failure control system for a belt-type continuously variable transmission according to claim 2, wherein said primary pulley torque capacity calculating means estimates the primary pressure according to the secondary pressure, has a map in which the torque capacity of the primary pulley is calculated in advance on the basis of each primary pressure estimated and reads out the torque capacity of the primary pulley from the secondary pressure.

4. A hydraulic pressure sensor failure control system for a belt-type continuously variable transmission according to claim 1, wherein said primary pulley torque capacity calculating means estimates the primary pressure according to the secondary pressure, has a map in which the torque capacity of the primary pulley is calculated in advance on the basis of each primary pressure estimated and reads out the torque capacity of the primary pulley from the secondary pressure.

5. A hydraulic pressure sensor failure control system for a belt-type continuously variable transmission according to claim 1, wherein the pulley reverse rotation time control means compares an input torque and the torque capacity of the primary pulley and sets the line pressure on the basis of a control input torque obtained by increasing and correcting the input torque according to a shortage of the torque capacity of the primary pulley when the input torque is larger than the torque capacity of the primary pulley.

6. A hydraulic pressure sensor failure control system for a belt-type continuously variable transmission according to claim 1, wherein the pulley reverse rotation time control means sets an output torque of the engine to be equal to or smaller than the torque capacity of the primary pulley.

* * * * *

UNITED STATES PATENT AND TRADEMARK OFFICE
CERTIFICATE OF CORRECTION

PATENT NO. : 7,192,372 B2
APPLICATION NO. : 10/647900
DATED : March 20, 2007
INVENTOR(S) : Makoto Sawada It is certified that error appears in the above-identified patent and that said Letters Patent is hereby corrected as shown below:

On Title Page

Item (73) ASSIGNEE: the Assignee is incorrect and should appear as follows:

--JATCO Ltd--

Signed and Sealed this

Eleventh Day of September, 2007

JON W. DUDAS
*Director of the United States Patent and Trademark Office*